United States Patent
Hansen et al.

(10) Patent No.: US 7,596,473 B2
(45) Date of Patent: Sep. 29, 2009

(54) METHOD OF CONSTRUCTING A VIRTUAL CONSTRUCTION MODEL

(75) Inventors: Mark William Hansen, Nibe (DK); Lisbeth Valther Pallesen, Varde (DK); Ronny Scherer, Vejle Ø (DK)

(73) Assignee: InterLego AG (CH)

( * ) Notice: Subject to any disclaimer, the term of this patent is extended or adjusted under 35 U.S.C. 154(b) by 448 days.

(21) Appl. No.: 11/285,939

(22) Filed: Nov. 23, 2005

(65) Prior Publication Data

US 2006/0136180 A1 Jun. 22, 2006

Related U.S. Application Data

(63) Continuation-in-part of application No. 10/441,464, filed on May 20, 2003, now Pat. No. 7,480,597.

(30) Foreign Application Priority Data

Aug. 25, 2005 (DK) ................ 2005 01182

(51) Int. Cl.
*G06F 17/50* (2006.01)
(52) U.S. Cl. ............... 703/1; 345/420; 446/85
(58) Field of Classification Search ............ 703/1
See application file for complete search history.

(56) References Cited

U.S. PATENT DOCUMENTS

| | | | | |
|---|---|---|---|---|
| 4,821,197 | A * | 4/1989 | Kenik et al. | 700/106 |
| 5,515,524 | A * | 5/1996 | Lynch et al. | 703/13 |
| 6,004,021 | A * | 12/1999 | Rothbarth | 703/2 |
| 6,389,375 | B1 | 5/2002 | Thomsen et al. | 703/2 |
| 6,814,643 | B1 | 11/2004 | Dooley et al. | 446/175 |
| 7,337,131 | B2 * | 2/2008 | Suzuki et al. | 705/26 |
| 2002/0196250 | A1 * | 12/2002 | Anderson et al. | 345/420 |
| 2004/0236539 | A1 | 11/2004 | Clark et al. | 703/1 |

FOREIGN PATENT DOCUMENTS

| | | |
|---|---|---|
| WO | WO 00/43959 | 7/2000 |
| WO | WO 2004/034333 A1 | 10/2003 |
| WO | WO 2004/104811 A3 | 5/2004 |
| WO | WO 2004/1048111 A2 | 12/2004 |

OTHER PUBLICATIONS

Clague et al, "LEGO Software Power Tools", Syngress Publishing, Inc., 2002, pp. ix-xx, 1-12, 39-73, 91-105, 159-171, 185-190; 205-211; 237-241, 337-347.*
Gausemeier et al, "AR-Planning Tool-Designing Flexible Manufacturing Systems with Augmented Reality", Eighth Eurographics Workshop on Virtual Environments, 2002).*
Virtual Lego, The Official LDraw.org Guide to LDraw Tools for Windows, Tim Courtney, Steve Bliss, and Ahui Herrera, No Starch Press, 126 pages, 2003.

* cited by examiner

*Primary Examiner*—Paul L Rodriguez
*Assistant Examiner*—Mary C Jacob
(74) *Attorney, Agent, or Firm*—Cantor Colburn LLP (57) ABSTRACT

A method of constructing a virtual construction model, comprising: displaying a plurality of construction elements corresponding to respective types of construction elements, allowing a user to select one or more instances of each of the types of construction elements; maintaining a counter of available elements for each type of construction elements; decrementing said counter of available elements of a type of construction elements each time a user selects a construction element of said type; providing an indication to the user when the available number of construction elements of one of the types of construction elements has been used in the virtual construction model.

7 Claims, 10 Drawing Sheets

METHOD OF CONSTRUCTING A VIRTUAL CONSTRUCTION MODEL

CROSS REFERENCE TO RELATED APPLICATIONS

This application is a continuation-in-part of U.S. patent application Ser. No. 10/441,464, filed May 20, 2003, now U.S. Pat. No. 7,480,597 the entire contents of which are incorporated herein by reference.

FIELD OF THE INVENTION

The present invention relates to the generation and/or selection of building instructions for building block models. This application claims priority under 35 U.S.C. § 119 to Danish patent application No. PA 200501182 filed Aug. 25, 2005, the entire contents of which are incorporated herein by reference.

BACKGROUND OF THE INVENTION

There are various known types of modelling concepts of physical construction toy sets. Especially, concepts using modular or semi-modular concepts are very popular as they provide an interesting and challenging play experience. Typically, these concepts provide a set of pre-manufactured elements or building blocks that can be interconnected with each other in some predetermined way according to modules of the pre-manufactured elements. The pre-manufactured elements resemble well-known objects adapted to a specific modelling task. Thus in e.g. building a model of a house the elements may resemble wall bricks, roof tiles, doors, and windows. The object of selecting the elements in this way is that the work involved with the building of a model of a house is reduced significantly compared to a situation where all details of the house are to be defined each time a new model should be made. However, the complete freedom in building a house or another object is traded off for the simplicity of building the model. For the purpose of the present description the building blocks of such a toy construction set will also be referred to as construction elements or simply "bricks".

For example, the toy construction sets available under the name LEGO comprise a plurality of different types of interconnectable building blocks having protrusions and corresponding cavities as connecting elements. The connecting elements are arranged according to regular grid patterns, thereby allowing a wide variety of interconnections between building blocks.

Typically, such toy construction sets comprise a set of building blocks suitable for creating one or more building block models, e.g. an animal, a robot, or another creature, a car, an airplane, a spaceship, a building, or the like. Typically, a construction set further includes printed building instructions or assembly instructions that illustrate how to construct a certain model from the building blocks of the set. Nevertheless, it is an interesting feature of such construction sets that they inspire children to create their own models.

Typically, the building instructions enclosed in a toy construction set comprise a sequence of pictures illustrating step by step how and in which order to add the building blocks to the model. Such building instructions have the advantage that they are easy to follow, even for children without great experience in toy construction sets and/or without reading skills.

US patent application 2004/0236539, the entire contents of which are incorporated herein by reference, discloses a process for maintaining a repository of virtual toy construction models where users may upload their own virtual construction models, view and download their own uploaded models and models uploaded by other users. The above prior art process further provides functionality for generating a bill of materials for a selected model as well as building instructions such that the user may construct a physical toy construction model of which he/she found a virtual model in the repository. The process even provides functionality that allows a user to order the physical construction elements required to construct the model.

However, it remains a problem of providing an improved selection mechanism for selecting toy construction models that may be interesting for a user to download.

SUMMARY OF THE INVENTION

The above and other problems are solved by a method of selecting a virtual toy construction model, the method comprising receiving by a host computer system a digital representation of an input toy construction model, the input toy construction model including a plurality of construction elements; generating a bill-of-materials that includes at least all construction elements of the received input construction model; performing a search in a repository of respective digital representations of a plurality of virtual toy construction models for one or more construction models that can be constructed from the set of construction elements included in the bill of materials; presenting on a client computer system at least one of the construction models identified in the search.

Hence, a user is presented with alternative construction models that the user may construct from the construction elements included in or required for the input construction model, thus providing the user with a pick list of alternative models/inspirational models that the user actually would have sufficient construction elements to build when purchasing the construction elements required for the input toy construction model.

It is an advantage that the user receives a pick list of relevant alternative models without requiring additional inputs from the user in addition to a representation of the input construction model.

The input digital representation may be a representation of a construction model created by a user on a client computer system and uploaded by the user to the repository. Alternatively, the input digital representation may be a digital representation of a construction model from the construction models available in the repository. Hence, a user may navigate through the repository of models, e.g. by a browsing function, a search function, etc. For each selected model, the user may be presented with a bill of materials for the selected model plus a pick list of alternative or inspirational models that are available in the repository and that may be constructed from the construction elements required for the selected model.

The present invention relates to different aspects including the method described above and in the following, corresponding devices, and computer programs, each yielding one or more of the benefits and advantages described in connection with the above-mentioned methods, and each having one or more embodiments corresponding to the embodiments described in connection with the above-mentioned methods.

Toy construction sets often comprise a large variety of different types of construction elements, e.g. elements of different shape, size, colour, etc. Often, the different types of construction elements are pre-packaged into sets of construction elements in order to simplify the packaging process.

Hence, when generating the bill of materials for a virtual construction model constructed by a user, the bill of materials may comprise a list of such pre-packaged sets, such that the user obtains, when purchasing the sets on the list, at least the construction elements necessary for building the construction model.

US 2004/0236539 describes a process for generating such a bill of materials where the number of prepackaged bags is optimised such that the user does not need to purchase too many additional construction elements that are not necessary for the model in question.

However, it remains a problem to further reduce the number of such excess elements.

The above and other problems are solved by a method of constructing a virtual toy construction set, comprising displaying a plurality of construction elements corresponding to respective types of construction elements, allowing a user to select one or more instances of each of the types of construction elements; maintaining a counter of available elements for each type of construction elements; decrementing said counter of available elements of a type of construction elements each time a user selects a construction element of said type; providing an indication to the user when the available number of construction elements of one of the types of construction elements has been used in the virtual construction model.

Consequently, it is an advantage of the above method that it prevents the user from using more bricks of any given type than available in the selected active sets of bricks. Hence, if the user intends to subsequently order physical bricks required to build a physical model that corresponds to the virtual model constructed in the virtual building area, the user may avoid having to purchase unnecessarily many sets of bricks. In a system with unlimited palettes, i.e. where there is no limitation on the number of bricks of each type that a user may select, situations may occur where a user has to buy an entire new set of bricks only because he/she may have used a single brick too many in the virtual model. Similarly, the user may constrain the virtual building activity to building blocks that he/she already has in his/her possession.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. In particular, in some embodiments, different parts of the computer program code may be executed on different computers, e.g. a client system and a host system as described herein.

For example, the program code means may be loaded in a memory, such as a RAM (Random Access Memory), from a storage medium or from another computer via a computer network. Alternatively, the described features may be implemented by hardwired circuitry instead of software or in combination with software.

According to one aspect, a data processing system is suitably configured to perform the steps of the method described above and in the following.

According to another aspect, a computer program comprises computer-executable instructions adapted to cause, when executed on a data processing system, the data processing system to perform the method described above and in the following.

In some embodiments, the computer program product comprises a computer-readable medium having stored thereon the computer-executable instructions. In other embodiments, the computer program product is embodied as a data signal, e.g. a suitably modulated carrier signal.

For the purpose of the present description, the terms storage means and computer-readable medium are intended to comprise any suitable storage medium, device or circuit, e.g. a read-only-memory (ROM), a random access memory (RAM), a flash memory, an Erasable Programmable Read-Only Memory (EPROM), volatile or non-volatile memory, an optical storage device, a magnetic storage device, a diskette, a CD, a hard disk, or the like.

BRIEF DESCRIPTION OF THE DRAWINGS

The above and other aspects will be apparent and elucidated from the embodiments described in the following with reference to the drawing in which:

FIG. 5c shows a more detailed view of the model upload process.

DETAILED DESCRIPTION OF PREFERRED EMBODIMENTS

Figure 1:
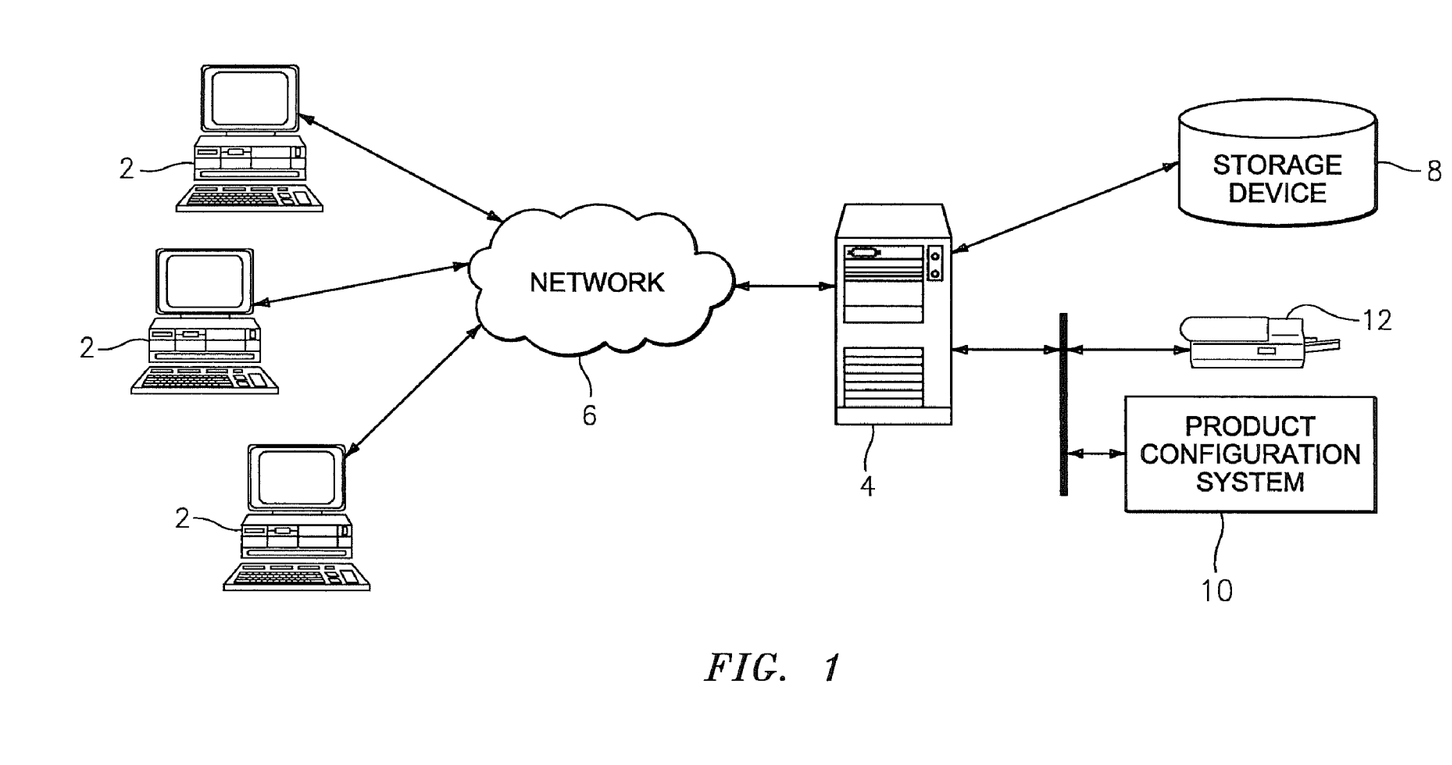
FIG. 1 is a block diagram of an exemplary system for generating a virtual brick model.

FIG. 1 is a block diagram of an exemplary system for generating a virtual brick model. The term "brick" refers to any discrete building item or construction element such as toy building elements available from LEGO. Such toy building elements may include coupling studs for frictionally interconnecting the toy building elements. Of course, other coupling or interlocking mechanisms may be used such as ball and socket. The bricks are not necessarily limited to orthogonal shapes, but may have a variety of shapes. The system of FIG. 1 includes user or client systems 2. Each user system 2 may be implemented using a general-purpose computer executing a computer program for carrying out the processes described herein. The user systems 2 may be personal computers owned by consumers or computers placed in consumer locations such as toy stores, theme parks, etc. User system 2 may also be a mobile device such as a phone or handheld, a game console such as a Sony Playstation or Nintendo GameCube, or other digital device with a display, controls, and a network or wireless connection.

A host system 4 is in communication with the user systems 2 through network 6. The host system 4 may be implemented using existing servers and executes a computer program for carrying out the processes described herein. Host system 4 serves as a central location for virtual brick models, enables uploading and downloading of virtual brick models and initiates distributing physical bricks based on a virtual brick model.

The network 6 may be any type of known network including a local area network (LAN), wide area network (WAN), global network (e.g., Internet), intranet, etc. The user system 2 may be coupled to the host system 4 through multiple networks (e.g., intranet and Internet) so that not all user systems 2 are coupled to the host system 4 via the same network. One or both of the user systems 2 and the host system 4 may be connected to the network 6 in a wireless fashion and network 6 may be a wireless network. In a preferred embodiment, the network 6 is the Internet and each user system 2 executes a user interface application (e.g., web browser) to contact the host system 4 through the network 6. Alternatively, a user system 2 may be implemented using a device programmed primarily for accessing network 6 such as a remote terminal.

The host system 4 operates as a network server (often referred to as a web server) to communicate with the user systems 2. The host system 4 handles sending and receiving information to and from user systems 2 and can perform associated tasks. The host system 4 may also include a firewall to prevent unauthorized access to the host system 4 and enforce any limitations on authorized access. For instance, an administrator may have access to the entire system and have authority to modify portions of the system. The firewall may be implemented using conventional hardware and/or software as is known in the art.

The host system 4 also operates as an applications server. The host system 4 executes one or more computer programs to coordinate generating, viewing, manipulating, uploading and downloading virtual brick models and ordering physical bricks. The host system 4 also interacts with a product configuration system 10 that coordinates distribution of physical bricks if requested by a user. The system includes a printer 12 that generates printed building instructions that accompany bricks of the physical model as described herein. It is understood that separate servers may be used to implement the network server functions and the applications server functions. Alternatively, the network server, firewall and the applications server can be implemented by a single server executing computer programs to perform the requisite functions.

Storage device 8 may be implemented using a variety of devices for storing electronic information such as a file transfer protocol (FTP) server. It is understood that storage device 8 may be implemented using memory contained in host system 4 or may be a separate physical device. Storage device 8 contains a variety of information including virtual brick models submitted from user systems 2, building instructions for virtual brick models, and physical brick identifiers corresponding to virtual brick models. Storage device 8 may also contain information concerning the submission of a virtual brick model (e.g., a unique virtual brick model identifier, a user identifier, date and time of submission, etc.). In addition, information concerning the delivery of physical bricks and instructions to the user (e.g., brick counts, delivery date and time, shipping address, etc.) may be stored in storage device 8. Additionally, some or all the user systems may include local databases, e.g. for locally storing a users own models and/or storing a users own inventory of physical bricks or sets of bricks. In some embodiments, a part or all of the central database of the host system may be mirrored to a local database.

It is understood that the invention may be implemented by different computer-systems. For example, the entire process described herein may be executed on a single computer, e.g. a user computer or user computer system including a model database and/or a database including information about an inventory of bricks and/or sets of bricks. In yet another embodiment, the system may be implemented as a distributed system, e.g. a peer-to-peer system, of a plurality of user computers. In such an embodiment, the model database may be distributed among some or all of the participating user systems, thereby allowing all participating users to share their respective models.

Operation of the system will now be described with reference to FIGS. 2-6. The host system 4 serves as a central repository for virtual brick models submitted by users at user systems 2.

Figure 2:
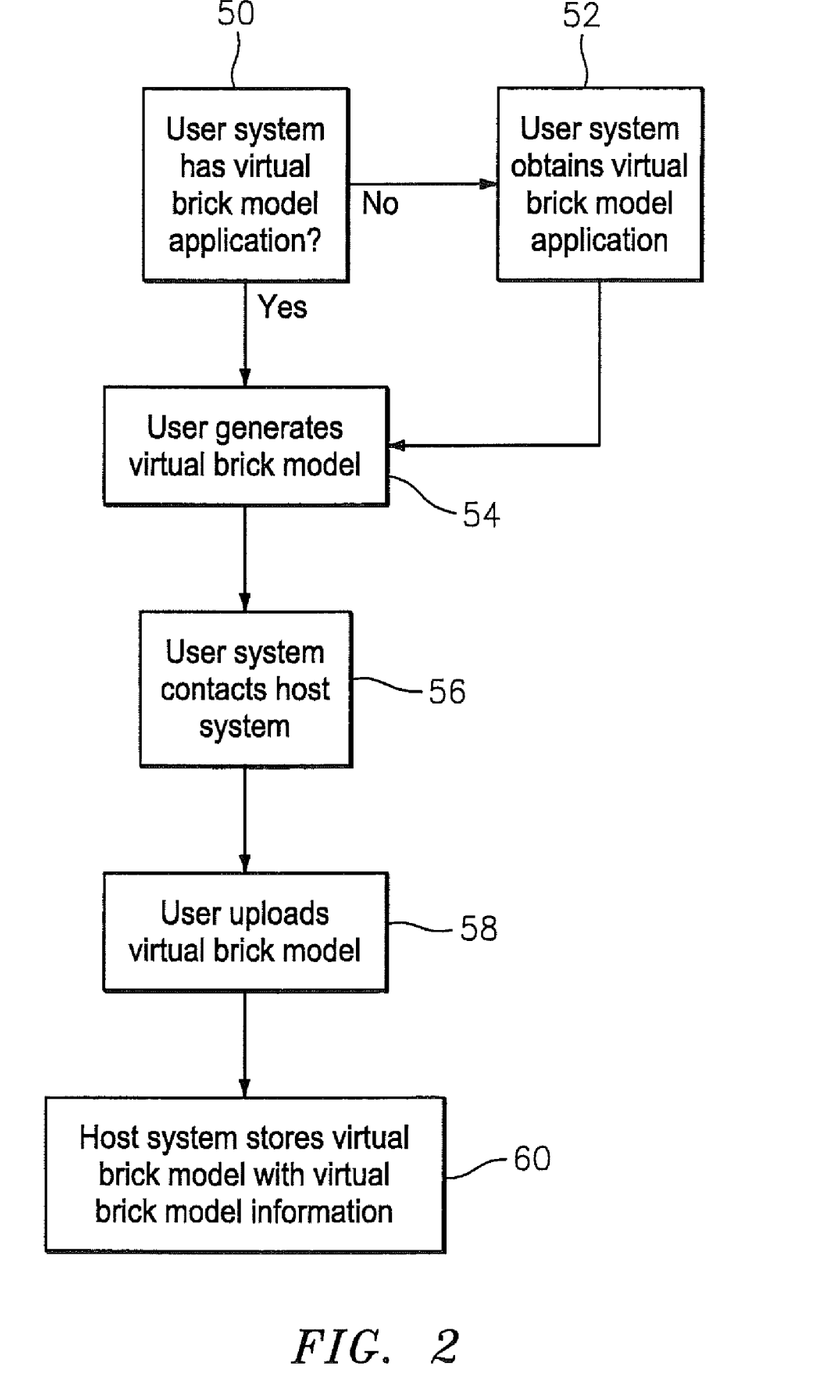
FIG. 2 is a flowchart of an exemplary process for generating a virtual brick model.

FIG. 2 is a flowchart of a process for generating a virtual brick model in one embodiment. The process begins at step 50 where it is determined whether the user system 2 includes a virtual brick model application. The virtual brick model application is a software application that allows a user to generate virtual brick models as described in further detail herein.

If the user system 2 lacks the virtual brick model application, the user system 2 contacts the host system 4 over network 6 to download and install the virtual brick model application on the user system 2 at step 52. Existing software routines (e.g., Installshield) are used to install the virtual brick model application on the user system 2. It is understood that downloading the virtual brick model application for installation on the user system is an exemplary embodiment. The virtual brick model application may be installed only on host system 4 and accessed via network 6. The virtual brick model application may be read from a storage medium at the user system such as a floppy disk, CD, etc. Alternatively, processing of the virtual brick model application may be divided among user system 2 and host system 4.

At step 54, the user then generates a virtual brick model through a user interface generated by the virtual brick model application at user system 2. At step 56, the user system contacts the host system. At step 58, the user uploads the virtual brick model. At step 60, the host system stores the uploaded virtual brick model in a model repository on the storage device 8.

Figure 3:
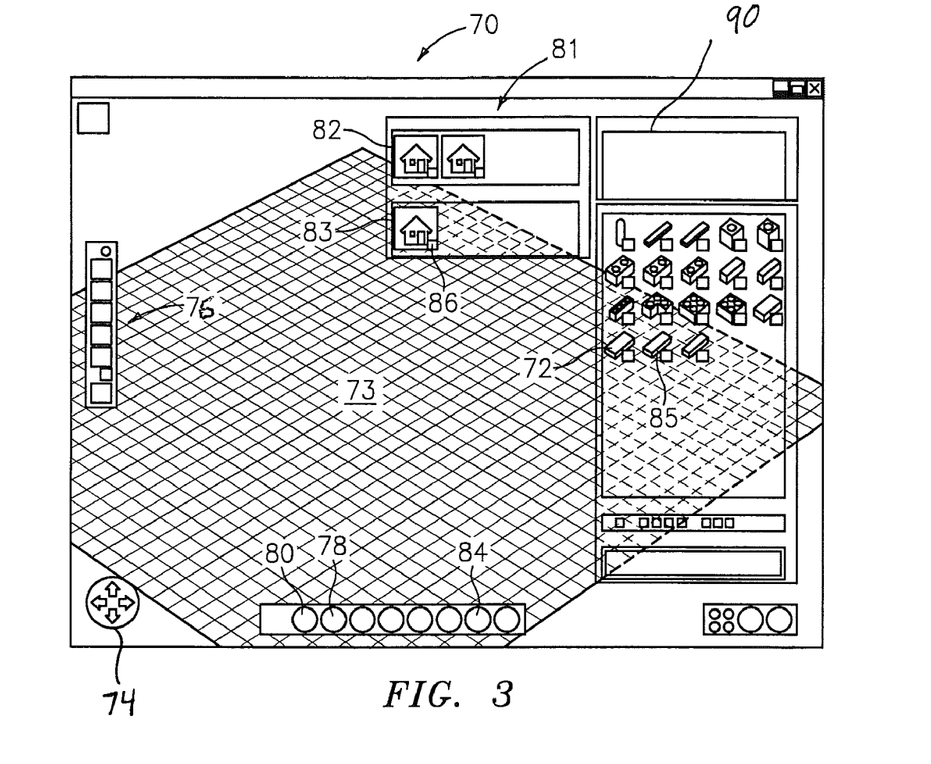
FIG. 3 shows an exemplary user interface for generating a virtual brick model.

FIG. 3 is an exemplary user interface 70 that allows a user to select a virtual representation of a brick from a list of bricks, represented graphically in virtual brick area 72, also referred to as palette. Using an input device at user system 2 (e.g., mouse, keyboard, trackball, etc.) the user can select bricks from virtual brick area 72 and assemble virtual brick models in virtual building area 73. An exemplary process and user interface for placing and assembling virtual bricks in a 3D scene is described in WO 2004/104811, the entire contents of which are incorporated herein by reference. The virtual brick area 72 is divided into a number of different sub-palettes, each sub-palette including different types of bricks, thereby making it easier for a user to identify any desired brick. Each sub-palette is represented by a brick in a sub-palette selection area 90 representative for the bricks included in that sub-palette. The bricks do not need to be in contact or connected. Through the input device, the virtual brick model can be rotated through rotation icons 74. The viewpoint from which the virtual building area 73 is seen may be changed and the point around which rotation and tilting takes place may be changed.

Virtual bricks within the virtual building area 73 may be moved and/or deleted though the input device. Tools may be selected from a tool area 76 to allow a user to deconstruct a virtual brick model of connected bricks by clicking on bricks with a tool that causes the bricks to disconnect, fly apart, and/or disappear. Virtual bricks may be moved, adjusted and rotated in ways that physical bricks can. For example, a virtual brick representing a window may be opened or closed. Similarly, hinged virtual bricks may be moved though various angles. A color tool may be selected to allow a user to change the color of the virtual bricks. The available colors may be restricted by whether that color of virtual brick exists in a physical brick. Such a restriction may be disabled by the user.

The user may save virtual brick models on the user system 2 (e.g., a local hard drive) through a save icon 78 or open and edit existing virtual brick models through an open icon 80. When the user saves a virtual brick model on user system 2, a digital representation of the virtual brick model is stored in a compact format. The compact format describes the virtual brick model as a list of virtual bricks placed in three-dimensional space. The compact model may also include graphical data if desired. The compact format also provides positional data for each virtual brick defining where the brick is positioned in a three-dimensional coordinate system.

Connectivity information identifying how the bricks are connected may also be included in the compact format. An exemplary format is described in WO 00/43959, the entire contents of which are incorporated herein by reference. Connectivity of the bricks may be defined using techniques such as those described in WO 2004/034333, the entire contents of which are incorporated herein by reference. The virtual brick model application stored on user system 2 includes 3D rendering software that generates a 3D representation of the virtual model (presented on a 2D display) based on the compact format.

The user interface further includes a product selection area 81 including an area 82 that shows a number of available sets of virtual bricks. For example, the sets may be related to different themes, such as a "robots" theme, a "cars" theme, a "spaceship" theme, etc. Each set corresponds to a set of bricks that is commercially available as a set of physical bricks. The user may select one or more of the sets in area 82. The selected sets are displayed as icons in an active sets area 83. Each set may be selected once or several times. Correspondingly, each icon in the active sets area 83 has a counter 86 associated with it that is displayed in association with or as part of the corresponding icon. Hence, when the user repeatedly selects a set from the available sets area 82, e.g. by clicking on the corresponding icon in the available sets area 82 with a pointing device, the counter of the corresponding icon in the active sets area is incremented. Similarly, the user may de-select one or more of the sets from the active sets area 83, causing the corresponding counter to be decremented.

The user interface further includes an icon 84 allowing a user to initiate an update of the brick sets in the available brick set area 82. Upon activation of the icon 84, the user system connects to the host system and downloads an update, e.g. an incremental update, of all brick sets that are currently commercially available in the region where the user has indicated he/she is located, including respective lists of bricks included in the brick sets.

The bricks included in the selected active set(s) of bricks are displayed in the virtual brick area 72. Each brick has a counter associated with it (as exemplified by e.g. counter 85 in FIG. 3) that indicates how many of the respective bricks are available in total in the selected active sets. Hence, whenever the user selects or de-selects an active set, the counters of the bricks included in that set are incremented/decremented by the number of bricks of the given type that are included in the selected/de-selected set.

Similarly, each time the user selects one of the virtual bricks from the virtual brick area 72 and places that brick in the virtual building area 73, the counter associated with the corresponding brick type is decremented. Similarly, if the user deletes a brick from the virtual building area 73, the counter associated with that brick type in the virtual building area is incremented. Thus, the palette 72 models a box of physical bricks that is filled with a finite number of bricks from a selected collection of sets of bricks. The user can now freely use the number of available bricks, but is notified when he/she has used the last brick of a given type, i.e. the corresponding counter in the virtual brick area is 0. For example, the system may change the appearance of the icons of the bricks that are used up. In some embodiments, the system may even prevent further selection of the corresponding brick from the palette, thereby preventing the user from using more bricks of any given type than available in the selected active set(s) of bricks. In some embodiments, the user interface allows the limited palette to be disabled in response to a user command, thereby allowing a user to build models with unlimited palettes, if the user so wishes.

Figure 4:
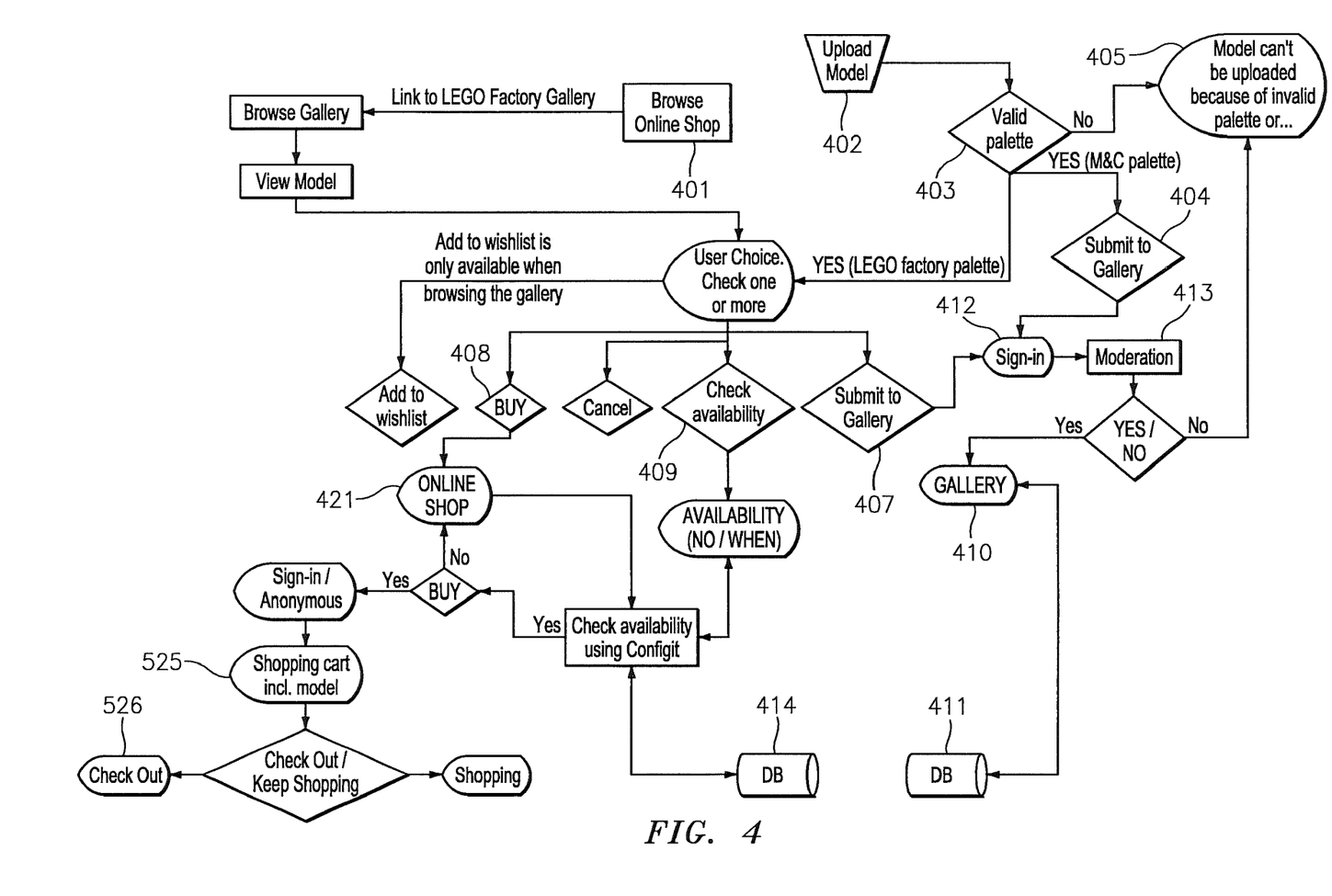
FIG. 4 shows an exemplary process for uploading a brick model and for purchasing bricks required to build a brick model.

With reference to FIGS. 4 and 5 an embodiment of a process for uploading a brick model and for purchasing bricks required to build a brick model will now be described.

Figure 5A:
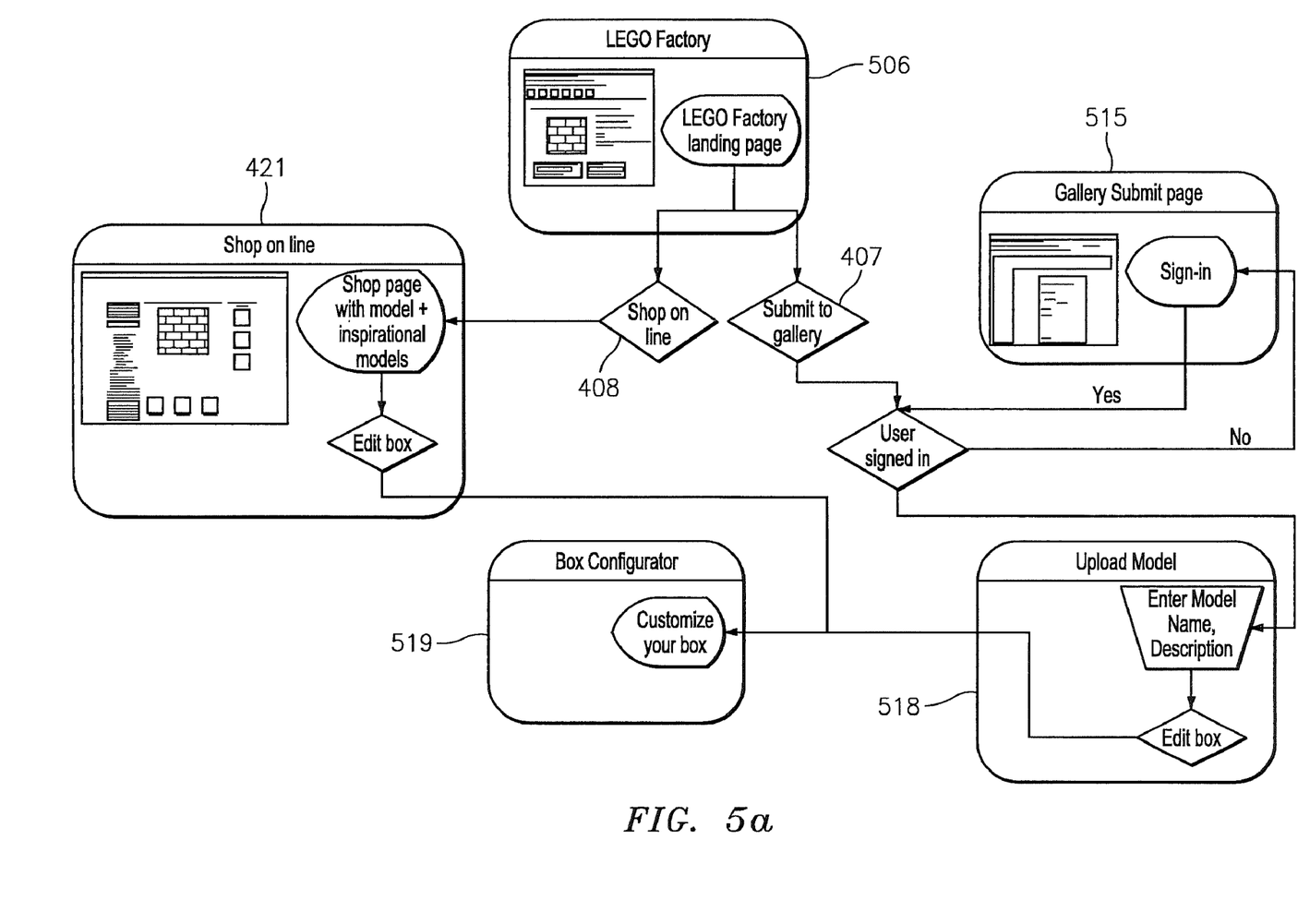
FIG. 5a shows an overview of the model submission and inline shopping processes.

In this embodiment, the user connects to the host system, e.g. by initiating an online shopping process (block 401) or by initiating an upload of a virtual brick model (block 402) from a client system to the host system. The brick model may have been constructed by a process as described above.

When the user selects to upload a model, the host system initially verifies (block 403) whether the palette of construction elements, i.e. the (sub-) collection of virtual bricks included in the virtual brick model is up-to-date, i.e. whether it includes bricks that are currently available for purchase as physical bricks.

If the brick palette is expired but valid, the system presents a user interface on the client system allowing the user an upload of the model in a repository 411 of virtual brick models (block 404). If the palette is invalid the system informs the user that the model cannot be uploaded (block 405)

If the brick palette is not expired and the corresponding bricks are available for purchase, the system presents a shop starting page (block 506) that allows the user to select whether to submit the uploaded model to a repository of virtual brick models (block 407) or whether to purchase physical bricks required in order to build a physical model corresponding to the uploaded virtual brick model (block 408). The system further allows a user to check the availability of the bricks without initiating a purchase (block 409)

Hence, in both cases, the user may upload (block 518) a digital representation of the brick model to the host system by executing a model submission process (block 515), thereby allowing other users to download the model, generate and/or download building instructions for the model and/or purchasing the bricks required for building the model. To this end the system stores the uploaded digital representation in a database 411 of virtual models, optionally together with further information, such as a model name, name of the submitter of the model, etc. In some embodiments, the model submission is conditioned on a signing in of the submitter (block 412)

and/or a moderation process (block 413), in order to avoid that undesired or inappropriate models are made available on the website. The models stored in the repository are accessible to users via a gallery process (block 410) including a gallery start page as described herein. Furthermore, in some embodiments, upon uploading a user-generated model onto the host system, the host system may update index data stored together with the virtual models in the model database or, as in the example of FIG. 4, in a separate database 414 that includes information about available brick sets. The index data is indicative of which models require which bricks, thereby facilitating subsequent searches for models that can be built with a given set of bricks. For example, the index data may be stored in the form of an inverted index in a tree structure or in any other suitable way.

The system further provides functionality to the user, allowing the user to customise the box (block 519) in which bricks are shipped when the model submitter or another user purchases the bricks required for the uploaded model. For example, the user may select a picture to be printed on the box, a name for the model or the like.

From the gallery page 410, the user may further view other models, e.g. the models the user has submitted (block 516) or models submitted by other users (block 517).

Figure 5B:
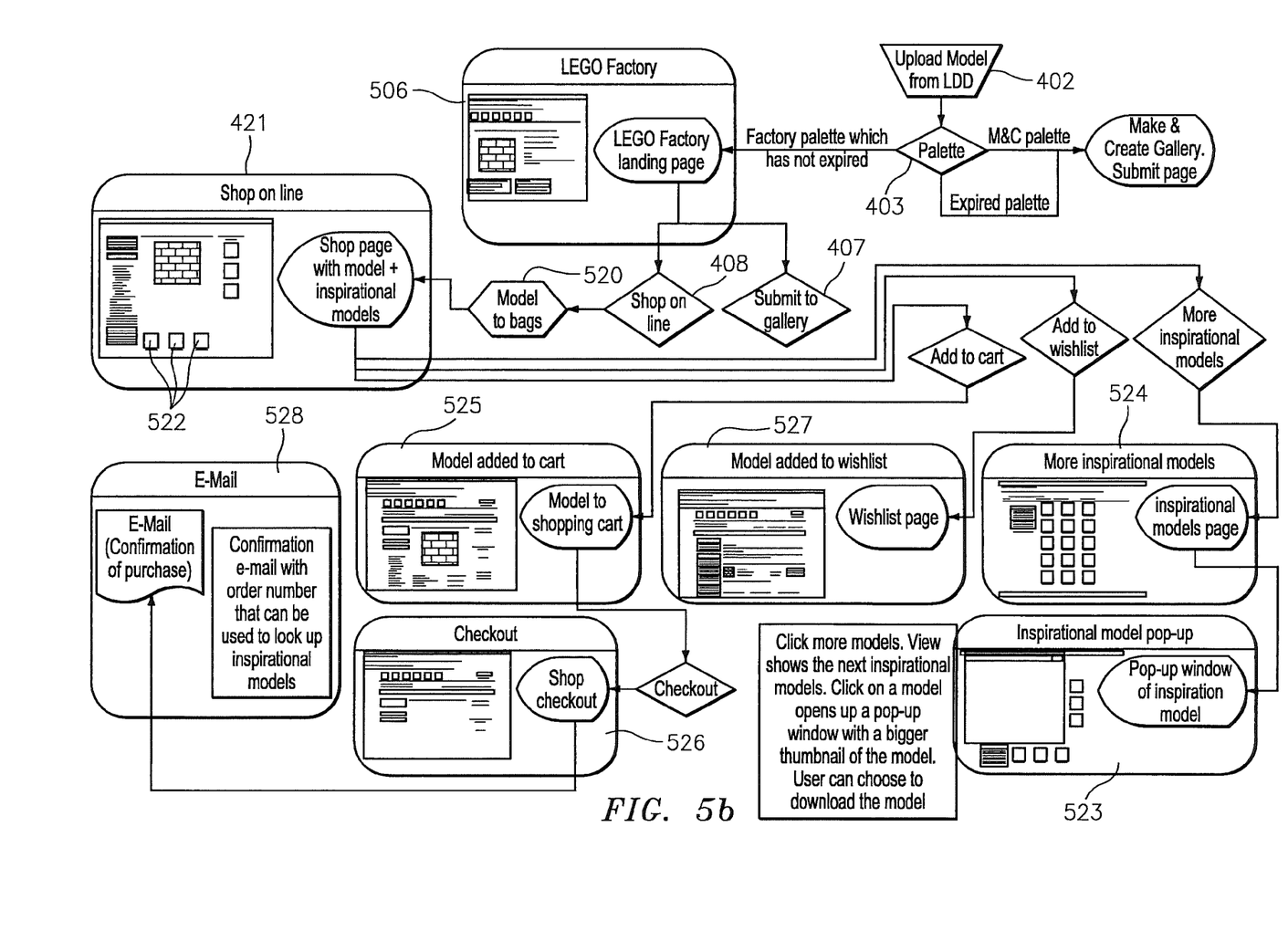
FIG. 5b shows a more detailed view of the online shopping process and FIG. 5c shows a more detailed view of the model upload process.
Figure 5C:
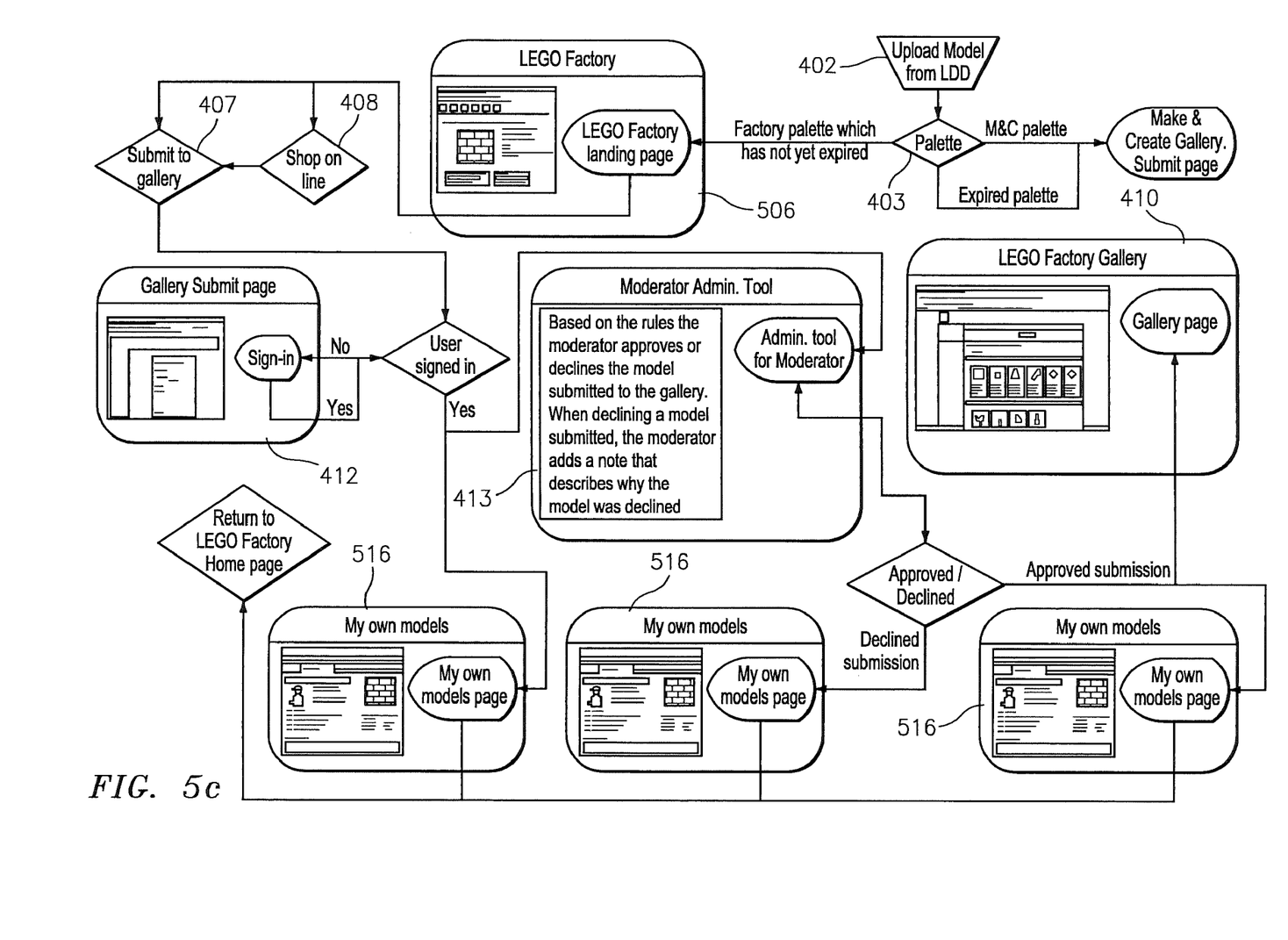
Figure 5D:
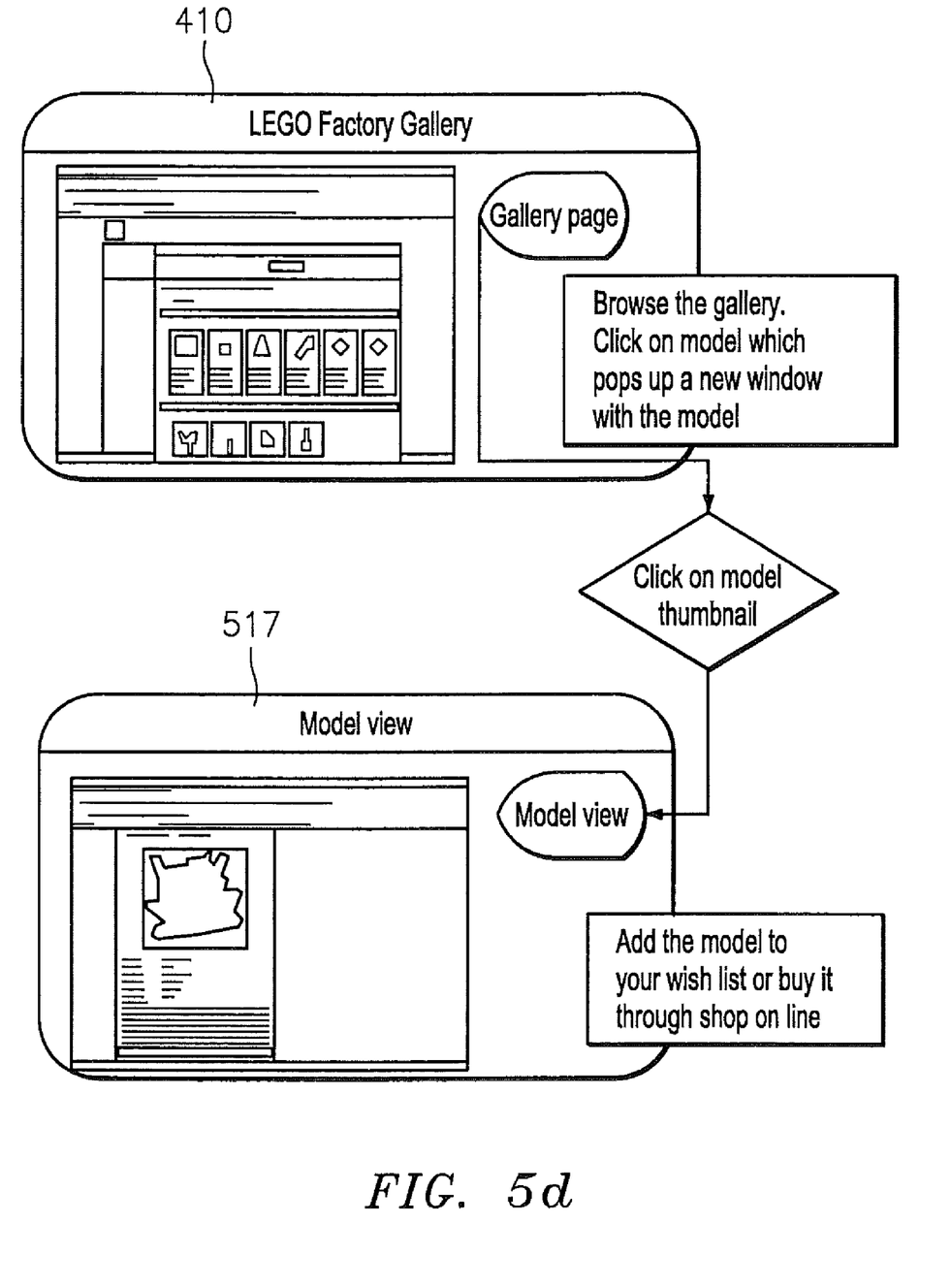
FIG. 5d shows a more detailed view of the process for browsing the gallery.

If the user selects to purchase physical bricks for the uploaded model or a model that the user has selected in the gallery of models, the host system initiates an online shop process that displays an online shop start page (block 421) showing the selected model. Initially, the process executes a bill-of-materials (BOM) routine 520 to determine what commercially available physical bricks or brick sets would be necessary to build the virtual brick model. For example, if the user created a virtual brick model of a rocket-powered car, the routine indicates to the user that purchase of a particular car set and a particular spaceship set will allow the user to build a physical brick model of the virtual brick model. The sets may be based on a theme (e.g., a spaceship) or contain a bulk assortment of bricks. Alternatively, the BOM routine may identify predefined brick packs that are needed to build the virtual brick model. A predefined brick pack may be, for example, a bag of bricks provided by the manufacturer that is used in one or more sets. If either existing sets or brick packs are identified, more physical bricks than necessary to build the virtual brick model are identified. In yet another embodiment, the BOM routine identifies individual physical bricks needed to complete the virtual brick model. The BOM routine may identity a combination of one or more sets, brick packs and individual bricks to build a physical model corresponding to the virtual brick model.

The software application to execute the BOM routine may be executed by the host system 4 which has access to the database 414—which may be stored on storage device 8—including definitions of pre-existing sets and brick packs. Operation of the BOM routine is as follows. First, either based on the virtual building application's internal data structures or based on an analysis of the virtual model compact format, a list of all the bricks in a model is generated. This list is referred to as a model list.

Second, a group of product lists is obtained by the host system 4, of products to match against. These product lists provide a list of bricks that can be found in those products. The exact lists that are obtained depend on the application. For an e-commerce application where a user at user system 2 is interested in ordering bricks through host system 4, the group of product lists would be based on what products (e.g., sets, brick packs, and individual bricks) are available for fulfilment in the country into which that user indicates they want the products shipped. A matching algorithm is used to match up the model list against the group of product lists. The matching algorithm goes through each product list one brick at a time, looking for each brick from the model list in the product lists. Instances where a brick is found in a product list are recorded (for example brick A from model list is found in product list 4), and the BOM routine moves on to the next brick in the model list. Once the occurrence of each model brick in each product list is determined, a result indicating which products are needed to build the model is determined. The results may be optimized based on optimization criterion such as the fewest possible products, or the lowest cost to the consumer, or the lowest number of unnecessary bricks (surplus bricks in the products list that are not on the model list), or the lowest time and resources to compute the result.

The results of one or more groups of products needed to provide bricks to build the virtual model are displayed to the user at user system 2, e.g. as part of the page 421. If the user system 2 is in communication with the host system 4, the user is provided the ability to purchase bricks as described in further detail herein.

As part of the BOM process 520 and based on the result from the initial BOM routine, the host system further executes a reverse BOM process that identifies virtual models stored in the repository associated with the host system, i.e. stored on the storage device 8, that can be made with the products included in the bill of materials generated for the selected model. A list of (a subset) of the identified models is presented to the user as inspirational models 522 that can be built when purchasing the products needed to provide bricks to build the initially selected product. Hence, a purchase decision is facilitated, since the user not only receives information about the required products but also about how many and which other models he/she would be able to construct.

The user may thus select one of the inspirational models 522 to view an enlarged image of the selected inspiration model (block 523). Furthermore, the user may download a digital representation of the model that may be loaded in the virtual model construction software or another software application for viewing and/or processing virtual brick models on the user system 2, thereby allowing a user to view the model, to generate building instructions, and even to modify the model. Alternatively or additionally, the model repository of the host system may have stored pre-generated building instructions, thereby allowing a user to download pre-generated building instructions, e.g. in a standard file format such as a PDF format or the like, for any selected inspirational model. Hence, the user may obtain inspirational building instructions even without having to install a virtual construction tool on the user system. If a large number of inspiration models are found for a certain selected model, only a subset may be shown at a time. In this situation, the host system provides functionality allowing the user to browse through the list of inspiration models (block 524), e.g. page by page, or to search through the list e.g. by key-words, name of the model creator, etc. It is an advantage of the system disclosed herein that the model repository, and thus the inspirational models that are presented with any given selected model, is updated each time a new model is uploaded. Therefore, a user may repeatedly connect to the host system and check whether new inspirational models related to a previously selected model are available.

Furthermore, the host system provides functionality to the user for purchasing the products that provide the bricks required for building the selected model, optionally with a printed or digital copy of the building instructions of the selected model and/or one or more selected ones of the inspirational models displayed together with the selected model. To this end the host system may provide known functionality for purchasing products over a computer network, including a virtual shopping cart functionality (block 525), a checkout functionality (block 526), a wish list functionality (block 527), and/or the like. Upon checkout, the system generates and sends an e-mail message to the user (block 528). The e-mail serves as a confirmation of the purchase and includes a reference number that may be used for subsequent easy access to the inspiration models related to the selected model. It is noted that, if the user subsequently accesses the system with the given reference number, the system may present additional inspiration models, e.g. if a user has submitted a new model in the meantime, that can also be constructed from the purchased bricks.

In another application users may want to know which models can be built if they purchase the products required for the selected model in combination with additional products and/or bricks, e.g. sets the users already have in their possession. In this case, the users may define a group of product lists or the contents of individual lists themselves e.g. by generating such a list on the user system and uploading it onto the host system. Alternatively or additionally, the host system may keep track of previously purchased products by such users. Hence, the host system may present—e.g. upon selection of a model by the user—inspirational models that the user is able to build from the previously purchased products and/or the products on the user-generated list together with the products/bricks required for the currently selected model. Alternatively, the list of bricks or sets already owned by the user may be stored locally on the user system. In yet another application, the host system may automatically generate suggestions for additional products and display inspirational models that may be built from the currently selected product if the user also purchases one or more of the additional products. For example, such additional products may be selected according to a suitable optimisation criterion, e.g. the number of inspirational models that a user would be able to build when also purchasing that product, or based on a sales campaign or the like.

Hence, in such an application, the host system would generate a total list of bricks or products, i.e. the bill of material of the selected model together with the additional products, and use that total list as an input when searching the repository of virtual models for models that can be built from the bricks on the total list.

As mentioned above, the system provides building instructions of the selected model and/or one or more inspirational models to the user. Such building instructions may be pre-generated and stored on the host system. If this is the case, the building instructions are retrieved and presented to the user system 2. If building instructions are not yet associated with the virtual brick model, the user may be given the option to manually generate building instructions or have the host system 4 automatically generate building instructions. Alternatively, the user can download the virtual brick model to the user system 2, generate the building instructions locally at user system 2 and upload the virtual brick model and building instructions to host system 4. The user may add building instructions to their own virtual brick models or virtual brick models created by others. The building instructions may then be saved on storage device 8 along with the virtual brick model. The building instructions may also be printed on a printer coupled to user system 2.

Figure 6:
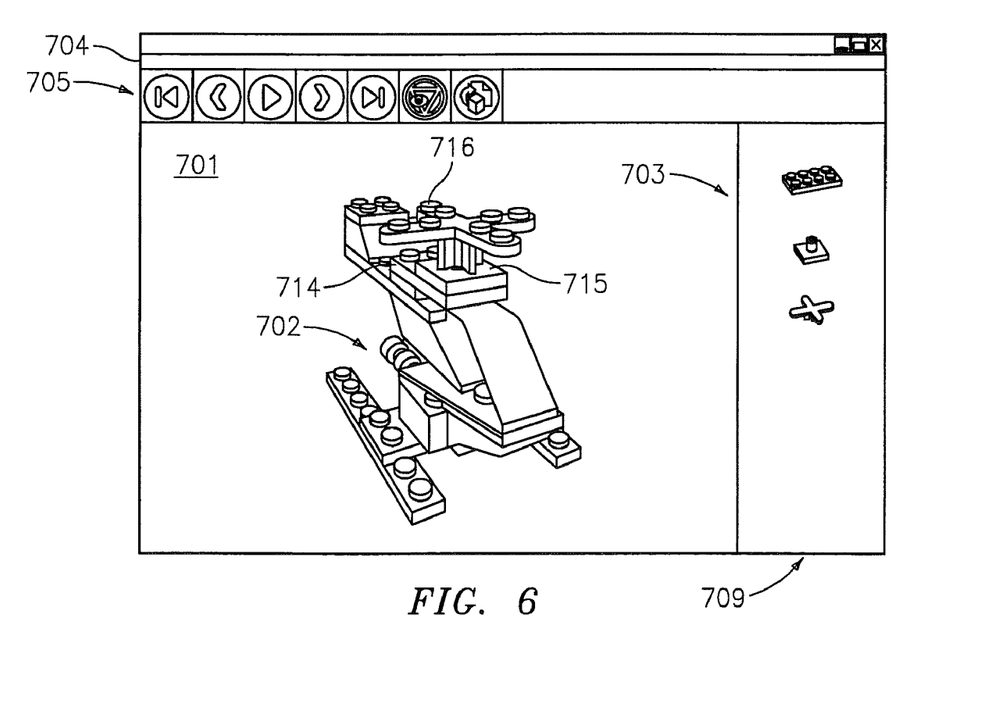
FIG. 6 illustrates an embodiment of a graphical user-interface of a building instruction application program.

FIG. 6 illustrates an embodiment of a graphical user-interface of a building instruction application program.

During model generation as described herein, the user typically positions one building block at a time, e.g. by adding a newly selected building block or by repositioning a previously placed building block: Consequently, the building process imposes a sequential order of building steps. This sequential order may be recorded by the modelling application that is executed in the user system. Nevertheless, in some embodiments several building blocks may be placed simultaneously. For example, in some embodiments the modelling application provides a copy-and-paste function where one or more interconnected building blocks may be selected in response to a user command, and a copy of the selected sub-structure may be positioned at a different position of the model. In this embodiment, each of the selected building blocks has a position in the sequential ordering. When generating a copy of the plurality of building blocks, they keep their relative sequential ordering with respect to the other selected and copied building blocks, thereby simply maintaining their relative sequential ordering with respect to another during the copy operation.

Consequently, in some embodiments, the digital representation of the virtual brick model includes information about a sequential order in which the bricks were assembled during the modelling process. Consequently, the stored information about the recorded sequential order of construction steps may be loaded by a building instruction application. The building instruction application may be executed on the user system and operate of a locally stored or downloaded digital representation of a model, or it may be executed on the host system and operate on an uploaded virtual brick model.

The building instruction application generates a building instruction from the loaded digital representation. In particular, the building instruction application generates a sequence of 3D views of part models, where each part-model is distinguished from the immediately preceding part-model in that a predetermined number of additional building blocks are added to the model according to the stored sequence of construction steps or according to a sequence derived therefrom. The building instructions may be presented electronically, printed, or presented in another suitable way. In some embodiments, the generation of the building instructions may be controlled by a user. For example, the user may select the number of additional building blocks to be added in each step. Furthermore, the user may manipulate the generated 3D views, including changes of a camera position, etc., as will be described below. The user may be a user of the user system, or an operator of the host system, e.g. a moderator of the host system. Accordingly, a user may automatically generate building instructions for any virtual model that the user has generated or received from another computer, e.g. downloaded from the host system. Alternatively, the application may be executed on the host system, e.g. as to generate building instructions in response to a user-request for a selected model stored on the host system, or as to pre-generate and store building instructions for all models stored on the host system.

Referring to FIG. 6, the user-interface comprises a viewing area 701 illustrating a graphical representation of a step of a set of step-by-step building instructions. The graphical representation shows a 3D view of a part-model 702 shown from a predetermined camera position. The part model 702 consists of a subset of all the building blocks of the complete model, where the subset includes the initially positioned building blocks. The viewing area 701 further comprises a graphical representation 703 of the most recently placed building blocks, i.e. the building blocks that distinguish the present part-model 702 from the part-model of the previous step. In this example, these are the building blocks 714, 715, and 716 of the part-model 702.

The user-interface further comprises a slider control element 709 which may be moved in discrete intervals by a corresponding drag operation with the mouse, allowing a user to select any of the steps of the step-by-step instructions. In the example of FIG. 6, three new building blocks are added in each step of the instructions.

The user-interface further comprises button control elements 705 that allow a user to invoke a number of frequently used functions such as sequentially flipping through the graphical representations in a forward and backward direction, respectively, jumping to the first and last step of the instructions, changing the camera position, printing the generated building instructions, and initiating an "auto-play" function. The auto-play function displays the sequence of part models one by one such that each part model is shown for a predetermined period of time. Preferably, the user may configure the viewing time for each part-model in the auto-play function.

Finally, the user interface comprises a number of pull-down menus 704, allowing a user to initiate functionality such as a help function, functions for changing the camera position, zoom functions, etc. Further functionality provided by the building instruction application includes the loading of digital representations, a print function for printing the graphical representations of the part-models, and export functions for exporting the sequence of graphical representations of the part models, e.g. in a HTML format, or any other suitable graphical file format, such as TIF, JPG, BMP, etc.

Alternatively, other mechanisms for generating building instructions may be utilised e.g. generating a step-by-step instruction based on the position, e.g. the vertical coordinates, of the bricks within the model, based on a user defined sequence of bricks, and/or the like.

In some applications, a user may want to upload additional information associated with a virtual brick model. For example, in some applications, the virtual brick model may represent a physical brick model that includes user-programmable functionality. Examples of toy construction sets that include programmable bricks comprise the construction sets available under the name LEGO MINDSTORMS. These construction sets include a programmable brick that can be programmed by means of a computer to perform predetermined tasks. Another example of such a toy system is described in U.S. Pat. No. 6,814,643. Such programmable bricks typically include a programmable microprocessor and an interface, e.g. a serial port, an infrared port, a short range RF transceiver, and/or the like that allows the programmable brick to receive executable program instructions from a computer, e.g. a desktop PC, which program instructions cause the microprocessor of the programmable brick to perform a predetermined task. Hence, in such an application, a user may want to upload program instructions for a given brick model as to allow another user to download the program instructions and to transfer them to a programmable brick, e.g. after having built a physical brick model based on the downloaded building instructions as described herein. Accordingly, in some embodiments, the system described herein may provide functionality that allows a user to upload additional information, e.g. program instructions, to the host system. The additional information may be stored in database 411 in relation to a virtual brick model. The system may thus further provide a user interface, e.g. as a part or in relation to the user interface described in connection with FIG. 8, that allows a user to download the additional information stored in relation to a virtual brick model.

Figure 7:
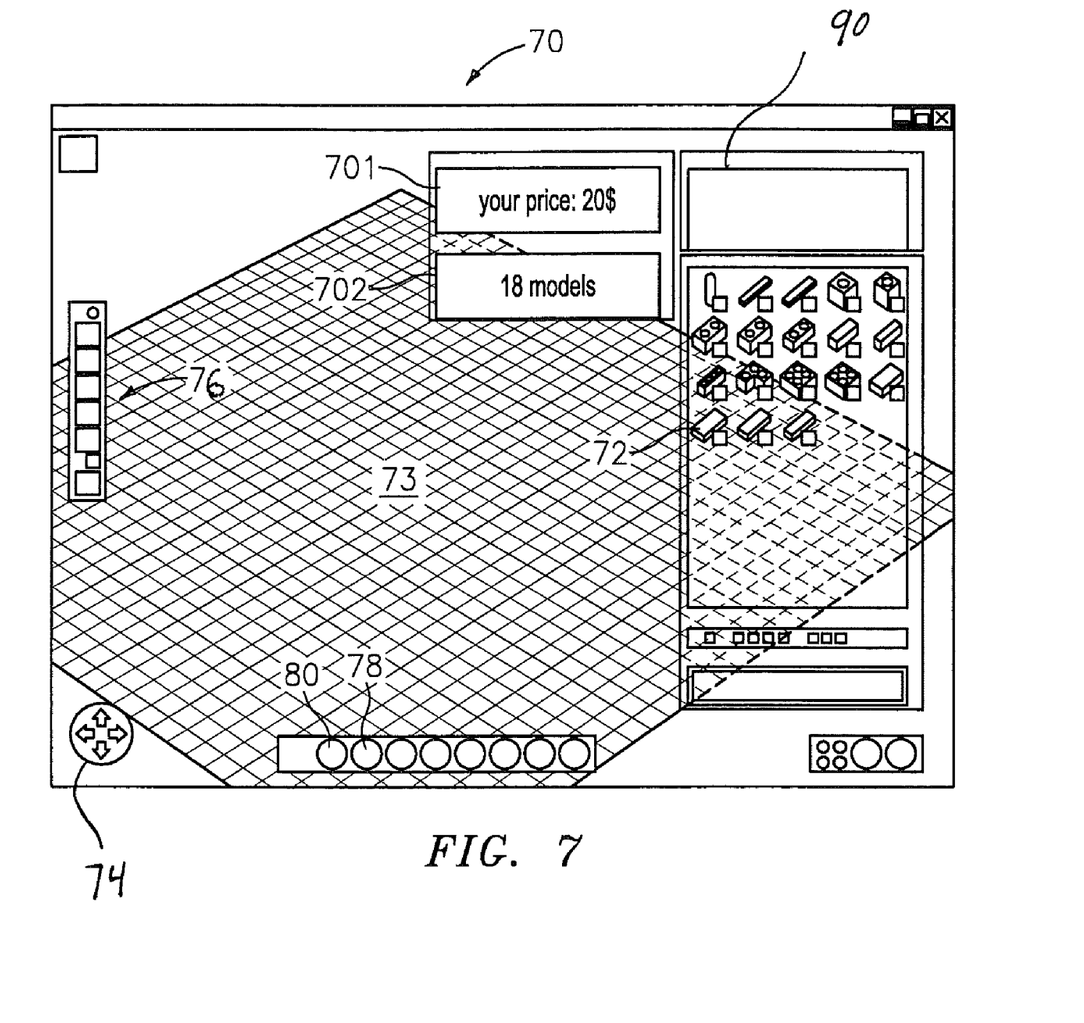
FIG. 7 shows another example of a user interface for generating a virtual brick model.

FIG. 7 shows another example of a user interface 70 that allows a user to select a virtual representation of a brick from a list of bricks, represented graphically in virtual brick area 72, also referred to as palette. The user interface of FIG. 7 is similar to the user interface shown in FIG. 3, and the same reference signs refer to the same or similar elements which will not be described in detail again.

However, instead of the product selection area, the user interface of FIG. 7 provides an price indication 701 to the user about the associated cost if the user was to order physical bricks (or sets of bricks including sufficient physical bricks) corresponding to the virtual bricks that the user has currently positioned/assembled in the virtual building area 73. To this end, each time the user selects an additional virtual brick from the palette 72 and places it on the virtual building area, the user system 2 initiates execution of a BOM routine as described herein, as to identify which bricks or sets of bricks would be required to build a corresponding physical model. The total price for the determined products is then displayed as the price indication 701, thereby providing a real time price indication. Similarly, if the user deletes a virtual brick from the virtual building area 73, the system determines an updated bill of materials and a corresponding price. In some embodiments, the BOM routine may be executed by the user system 2 and receive brick inventory data from a local database or—if the user system is connected to the host system 4—from a central database connected to the host system. Alternatively, the user system may send a request for calculating the price to the host system, the request including a digital representation of the current virtual model in the building area.

Accordingly, since the user always receives an updated price indication as he/she constructs the model, the user interface of FIG. 7 includes an unlimited palette, i.e. a palette that allows the user to select an unlimited number of instances of any available brick type.

The user interface further includes an indicator 702 showing how many inspirational models are available that can be constructed from the determined bricks or sets of bricks required to build the current virtual model in the building area. To this end, the user system initiates a reverse BOM routine as described herein, in order to determine which models in the model repository can be constructed from the bricks or sets of bricks determined to be sufficient for constructing the current model in the virtual building area. As described in connection with the determination of the price indication, the model search based on a reverse BOM process may be performed by the user system or by the host system. Furthermore, the search may be based on the local user database and/or the model repository of the host system. The indicator 702 may thus be updated each time the user adds or removes a brick from the virtual building area 73.

The indication 702 may further show a number of the identified inspirational models, e.g. by showing a number of model names, a number of small images or graphical renderings or the like. Furthermore, the graphical user interface may include an active element, e.g. a button, that can be activated by the user to cause the user to be directed to a page showing a list of inspirational models, e.g. as in block 524 described above.

In some embodiments, the system performs the re-calculation of the price and/or the update of the available inspiration models in response to a user command (e.g. in response to the user clicking on the price indication) rather than automatically each time a brick is added or removed.

Figure 8:
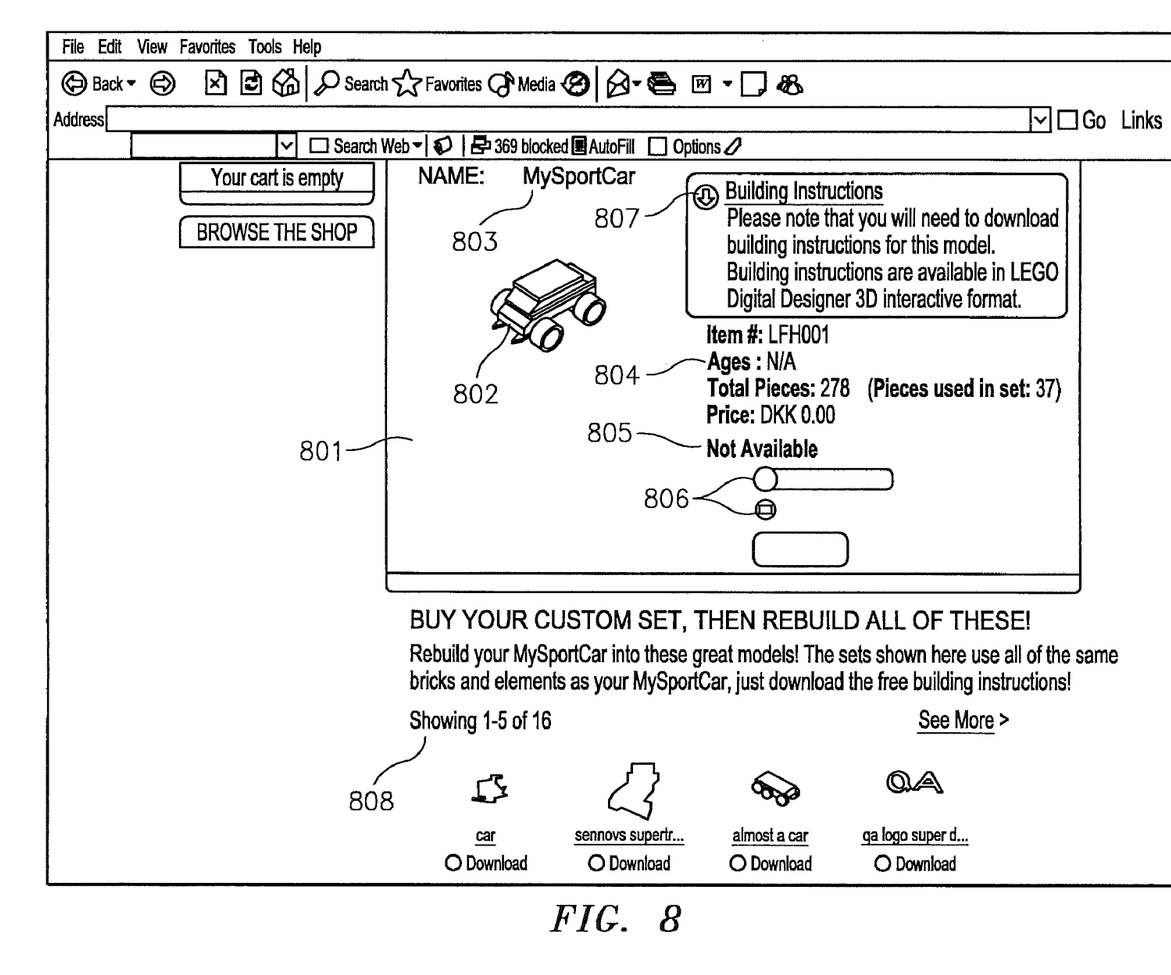
FIG. 8 shows an example of a user interface for viewing a selected model.

FIG. 8 shows an example of a user interface for viewing a selected model, e.g. generated by the process for viewing models (block 517) in a gallery or the online shopping process described herein (block 421).

The user interface shows a model presentation area 801 displaying a 3D rendering 802 of a selected model. The user interface further displays a model name 803 and further model information 804, including an availability status 805. The user interface further includes control elements 806 allowing the user to add the current model to a shopping cart or to e-mail the current page to a friend. The user interface further includes a control element 807 allowing the user to download building instructions for the present model.

The user interface further includes an inspirational model area 808 that shows a number of inspirational models identified in the model repository as described herein. In some embodiments, the inspirational models are identified in real-time by the process described herein, each time a user selects a model. In some embodiments, the inspirational models for all models in the repository are determined in regular intervals, e.g. by a daily batch process, and the respective lists of inspirational models may be stored in the model repository 411 or the database 414.

The inspirational model area 808 shows a number of inspirational models at a time, and the user may select to view more models if available. Each model has a control element associated with it, allowing a user to download a digital representation of the model to the user system, thereby allowing the user to generate building instructions, etc.

Although some embodiments have been described and shown in detail, the invention is not restricted to them, but may also be embodied in other ways within the scope of the subject matter defined in the following claims.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of constructing a virtual construction model, comprising:
    displaying a virtual building area, the virtual building area allowing a user to assemble a virtual construction model;
    displaying a plurality of construction elements corresponding to respective types of construction elements, allowing a user to select one or more instances of each of the types of construction elements and to place the selected one or more instances in the virtual building area;
    maintaining a counter of available elements for each type of construction element;
    decrementing said counter of available elements of a type of construction element each time a user selects a construction element of said type and places the selected construction element in the virtual building area;
    providing an indication to the user when the available number of construction elements of one of the types of construction elements has been used in the virtual construction model.

2. A method according to claim 1, further comprising
    allowing a user to select one or more active sets of construction elements from a collection of available sets of construction elements, each set of construction elements including one or more construction elements of one or more types of construction elements; and
    responsive to a user-selection of an active set of construction element, incrementing the counter of each type of construction element by the number of construction elements of said type in the selected active set of construction elements.

3. A method according to claim 1, further comprising receiving information about one or more available sets of construction elements.

4. A data processing system suitably configured to perform the steps of the method according to claim 1, wherein the system comprise a processor, a memory and a display.

5. A computer program product embodied on a computer readable storage medium comprising computer-executable instructions adapted to cause, when executed on a data processing system, the data processing system to perform a method of constructing a virtual construction model including:
    displaying a virtual building area, the virtual building area allowing a user to assemble a virtual construction model;
    displaying a plurality of construction elements corresponding to respective types of construction elements, allowing a user to select one or more instances of each of the types of construction elements and to place the selected one or more instances in the virtual building area;
    maintaining a counter of available elements for each type of construction element;
    decrementing said counter of available elements of a type of construction element each time a user selects a construction element of said type and places the selected construction element in the virtual building area;
    providing an indication to the user when the available number of construction elements of one of the types of construction elements has been used in the virtual construction model.

6. The method of claim 1, further comprising preventing further selection and placement in the virtual building area of a construction element of a type of construction element for which the corresponding counter has reached zero.

7. The method of claim 1, further comprising displaying the corresponding counter associated with each type of construction element.

* * * * *